US007359375B2

(12) United States Patent
Lipsanen et al.

(10) Patent No.: US 7,359,375 B2
(45) Date of Patent: Apr. 15, 2008

(54) METHOD AND APPARATUS FOR OBTAINING DATA INFORMATION

(75) Inventors: Matti Lipsanen, Turku (FI); Tero Naumi, Koski Tl (FI); Janne Aaltonen, Turku (FI); Juha Salo, Littoinen (FI)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 10/481,821

(22) PCT Filed: Jun. 25, 2002

(86) PCT No.: PCT/FI02/00554

§ 371 (c)(1),
(2), (4) Date: Jun. 21, 2004

(87) PCT Pub. No.: WO03/001755

PCT Pub. Date: Jan. 3, 2003

(65) Prior Publication Data

US 2004/0242203 A1   Dec. 2, 2004

(30) Foreign Application Priority Data

Jun. 25, 2001   (FI)   ................................. 20011342

(51) Int. Cl.
*H04L 12/66* (2006.01)
(52) U.S. Cl. .................... 370/355; 370/354; 455/412.1
(58) Field of Classification Search ................ 370/355, 370/352, 353, 354, 338, 401; 455/412.1, 455/412.2; 725/108
See application file for complete search history.

(56) References Cited

U.S. PATENT DOCUMENTS 6,011,796 A * 1/2000 Rezaiifar et al. ........... 370/394

6,366,893 B2 * 4/2002 Hannula et al. .............. 705/40

(Continued)

FOREIGN PATENT DOCUMENTS

EP   1 076 431 A2   2/2001

(Continued)

OTHER PUBLICATIONS

Kellerer, W et al.: IP based enhanced data casting services over radio broadcast networks, In: Universal Multiservice Networks, 2000. ECUMN 2000. 1st European Conference on. On pp. 195-203, Oct. 2-4, 2000. ISBN: 0-7803-6419-8. See whole document.

(Continued)

*Primary Examiner*—Melur Ramakrishnaiah
(74) *Attorney, Agent, or Firm*—Banner & Witcoff, Ltd.

(57) ABSTRACT

An apparatus and a method for providing user a wireless terminal operating within a wireless communication network an access to a resource storing content in a network of computing systems. A user message is transferred, the message including an identifier indicating the resource in the network of computing systems from the wireless terminal over the wireless communication network to a broadcast server having an access to the network. Communicating with the network of computing systems for retrieving the content indicated in the message. The content is broadcast over a broadcast network to the wireless terminal. The content, which is received at the wireless terminal, is presented at the terminal if the data packets of the content are substantially received at the wireless terminal.

28 Claims, 6 Drawing Sheets

U.S. PATENT DOCUMENTS

| | | | |
|---|---|---|---|
| 6,643,707 B1 * | 11/2003 | Booth .................. | 709/245 |
| 6,668,177 B2 * | 12/2003 | Salmimaa et al. .......... | 455/566 |
| 6,707,801 B2 * | 3/2004 | Hsu ..................... | 370/312 |
| 6,708,042 B1 | 3/2004 | Hayakawa | |
| 2002/0068599 A1 * | 6/2002 | Rodriguez et al. .......... | 455/550 |
| 2002/0194303 A1 * | 12/2002 | Suila et al. .................. | 709/218 |

FOREIGN PATENT DOCUMENTS

| | | |
|---|---|---|
| GB | 2 313981 A | 12/1997 |
| GB | 2313981 | 12/1997 |
| JP | 410174079 A * | 6/1998 |
| JP | A 2000-022628 | 1/2000 |
| JP | A 2000-197126 | 7/2000 |
| JP | A 2000-316178 | 11/2000 |
| JP | A 2000-354003 | 12/2000 |
| JP | A 2001-053699 | 2/2001 |
| WO | WO 98/58469 | 12/1998 |
| WO | WO 9856181 | 12/1998 |
| WO | WO 9857482 | 12/1998 |
| WO | WO 9914775 | 3/1999 |
| WO | WO 01/17288 A1 | 3/2001 |
| WO | WO 01/41488 A2 | 6/2001 |

OTHER PUBLICATIONS

Hartwig, S et al.: Mobile multimedia-challenges and opportunities. In: Consumer Electronics, IEEE Transactions on. On pp. 1167-1178. Nov. 2000, vol. 46, issue 4. ISSN: 0098-3063. See paragraphs 2,4; figure 4.

CN Office Action, Dec. 23, 2005.

* cited by examiner

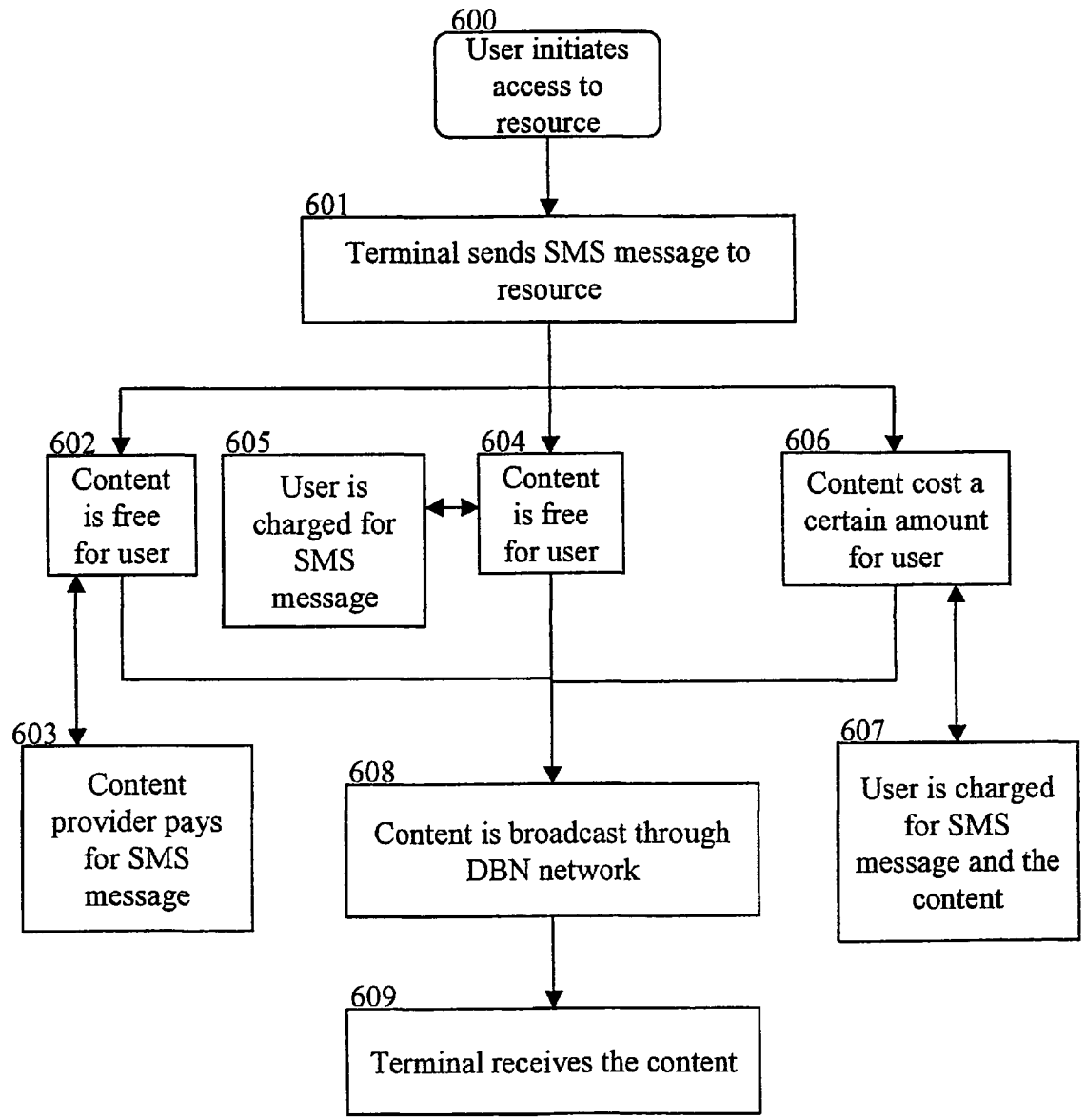

METHOD AND APPARATUS FOR OBTAINING DATA INFORMATION

This is a U.S. National Phase Application Under 35 USC 371 and applicant herewith claims the benefit of priority of PCT/FI02/00554 filed Jun. 25, 2002, which was published in English, based on Finnish application No. 20011342, filed on Jun. 25, 2001.

TECHNICAL FIELD OF THE INVENTION

The present invention relates generally to accessing information in communication networks, and more particularly, to a method and an apparatus for obtaining data information to a wireless terminal across multiple network platforms.

BACKGROUND OF THE INVENTION

Computer networking broadly refers to the data communication system resulting from linking two or more computing systems. Networking allows those who can access the network to share programs, data, network resources, database information, and to facilitate other functions such as e-mail and invoicing. The need for immediate access to information has fueled the pursuit of more sophisticated networks and network applications to conveniently and efficiently communicate information.

Due to its vast reach, the global web of interconnected computers and computer networks referred to as the Internet has proved to be an invaluable tool in satisfying the need for on-demand information. The Internet is used as a business and personal tool to facilitate global e-mail, remote data access, research, etc. Its ability to deliver multimedia content has also established the Internet as an entertainment tool for playing games, delivering stream content such as video, audio and MP3, and the like.

Gaining access to the information available on the Internet conventionally required a hardware connection to the Internet. While the Internet allows users to access information via any computer or terminal connected to the Internet, the need for a hardware connection established an undesirable physical limitation to Internet information access—a particular impediment to users that spend a substantial amount of time on the move. As users become more dependent on information and services provided via the Internet, an integration of the Internet and the wireless domain becomes increasingly important.

Mobile networks, such as GSM, IS-136, IS-95, PDC, etc., have traditionally been used in connection with mobile telephone communication. These sophisticated mobile networks made possible another aspect of communication convenience, by allowing mobile telephone users to communicate with other mobile users and with landline telephony systems. However, the need still existed to integrate information networks, such as intranets and the Internet, with the portability and convenience of mobile devices. This need gave rise to efforts to integrate the Internet and other networks with wireless network platforms.

The most sophisticated mobile networks enable an access to the Internet. However, the access and a transfer of data information from the Internet via mobile networks platform to the mobile have limited data transfer rate. Moreover, the transfer of the data is expensive via the mobile domain. The need to provide faster and cheaper communication channel to wireless domain still exists.

In view of various inherent limitations of mobile devices and existing network platforms, and the need to provide access to the wealth of data information available on existing network platforms, it would be desirable to avoid these and other problems associated with prior art systems. A need exists in the communications industry for an apparatus and a manner for obtaining data information via wireless devices from other networks, while increasing flexibility and user convenience. The present invention provides a solution to the aforementioned and other shortcomings of the prior art, while offering additional advantages over the prior art.

SUMMARY OF THE INVENTION

To overcome limitations in the prior art described above, and to overcome other limitations that will become apparent upon reading and understanding the present specification, the present invention discloses an apparatus and a method for communicating data information to a wireless terminal operating within a wireless network across multiple network platforms. The wireless device is not limited to any preset navigation structure, and provides the ability to communicate with the multiple network platforms.

In accordance with a first aspect of the invention there is provided a method for obtaining data content to a wireless terminal operating within a wireless communication network, the method having the steps of:

transmitting a message from the wireless terminal via the wireless communication network to a network for obtaining data content, the message indicating a resource containing the data information in the network, transferring one or more data packets relating to the data content from the resource over a broadcast network to the wireless terminal, comparing received data packets to a list of data packets forming the data content in order to identify possible existence of one or more missing data packets, which list is arranged to the terminal by obtaining the list to the wireless terminal, and creating an additional message for obtaining at least one of the missing data packets if such was identified.

In accordance with a second aspect of the invention there is provided a wireless terminal for obtaining data content, the wireless terminal adapted to operate within a wireless communication network, the wireless terminal comprising:

an input user interface to receive an address of the data content for addressing a message to a resource in a network via the wireless communication network, means for transmitting the message from the wireless terminal via the wireless communication network to the network for obtaining data content, the message indicating the resource containing the data content in the network, a broadcast network interface to receive one or more data packets relating to the data content from the resource over a broadcast network, means for comparing received data packets to a list of data packets forming the data content in order to identify possible existence of one or more missing data packets, which list is arranged to the terminal by obtaining the list to the wireless terminal, and means for creating an additional message for obtaining at least one of the missing data packets if such was identified, a memory to store the data content received over the broadcast network and received at the wireless terminal, and an output user interface to present the data content to the user of the wireless terminal.

Advantageously in one embodiment, an additional message for obtaining missing data packet(s) of received content is created. The wireless terminal receives the list of the data packets and compares received data packets to the data packets shown in the list. The wireless terminal marks received data packets and stores the data packets, thereby the missing data packet(s) can be identified. The additional message is sent to a broadcast server. The broadcast server checks the missing data packets from a site database. If the packets are not stored in the database, the broadcast server retrieves the data packets from the Internet. The data packets are broadcast to the wireless terminal.

Advantageously in another embodiment, wireless terminal outputs received content. The wireless terminal user selects a link in the output information and the wireless terminal generates a further message. The further message includes at least an address of the link for obtaining the resource of the link. The further message is sent to a broadcast server and the broadcast server retrieves the resource of the link via the Internet. Alternatively, the content of the link can be locally stored at the wireless terminal or a site database of the broadcast server can also store the content of the link.

Advantageously, another embodiment of the invention can be applied to a GSM environment. The wireless communication network comprises a GSM network and the user message conveying the address of the content comprises a Short Message Service (SMS) message. The address comprises a Uniform Resource Locator (URL) in the Internet and the content comprises data information in the Internet. A Short Message Service Centre (SMSC) receives the message and converts the message into a request. The request is forwarded to a broadcast server, the broadcast server bridging the communication between the GSM network, the Internet and the broadcast network. The broadcast network comprises a digital broadcast network (DBN). The broadcast server retrieves the data information from data server in the Internet. The broadcast server saves data information and creates a list of 15-25 data packets of the data information. The broadcast server forwards the list and the 15-25 data packets to the DBN. The list and the data packets are broadcast and the wireless terminal receives the list and the data packets.

In another embodiment, a charge for the user message is created. The charge is based on at least one of the following type of the resource related information, a function of time, a Quality Of Service (QOS) requirement of the content, a function of available bandwidth, a function of simultaneous users, a load in at least one of the networks and means for accessing to the resource related information. A monitoring program in a broadcast server keeps track on physical resources of the networks. In the embodiment where the wireless communication network comprises a GSM network the charging can be advantageously attached to the charging of a mobile phone in the GSM network. An operator of the GSM network can identity user and the message when requesting the data information from Internet and attach the charge.

In another embodiment, the means for transmitting the user message comprises a first wireless unit and the network interface comprises a second wireless unit, wherein the first and the second wireless unit comprises two independent devices. The first device is a mobile phone and the second device is a DVB terminal. The mobile phone sends the SMS message for requesting Internet data information. The DVB terminal receives the Internet data information, which is transmitted by the DVB network, in response to the SMS message. A communication link operatively couples the DVB terminal to the mobile phone. The communication link can, for example be, an infrared link, a cable and Bluetooth, etc.

For better understanding of the present invention reference is made to the following description, taken in conjunction with the accompanying drawings, and its scope will be pointed out in the appending claims.

BRIEF DESCRIPTION OF THE DRAWINGS

In the drawings:

The method and the apparatus according to the invention will be described in more detail by means of preferred embodiments, with references to the appended drawings in which:

FIG. 6 is a flow diagram of a further embodiment depicting a charging model of the short message and/or the content.

DETAILED DESCRIPTION OF THE VARIOUS EMBODIMENTS

The present invention is generally directed to an apparatus and a method for obtaining data information to a wireless terminal operating within a wireless communication network. The data information is preferably an Internet site, specific data information which the Internet site contains, etc. The present invention allows a user message to be entered at the wireless terminal, where the user message identifies the data information that the user requests. In one embodiment of the invention, such user messages are transferred from a wireless communication network to the Internet using a Short Message System (SMS). The message is converted to an Internet request for obtaining the data information and transmitted to a broadcast server configured to operate in the Internet environment. The data information identified by the message is thereafter retrieved and transmitted from the broadcast server back to the wireless terminal over a digital broadcast network (DBN) to be presented to the user via the wireless terminal. The DBN is preferably a Digital Video Broadcasting (DVB) network. A local memory of the wireless device may store the requested data information after it is checked.

Figure 1:
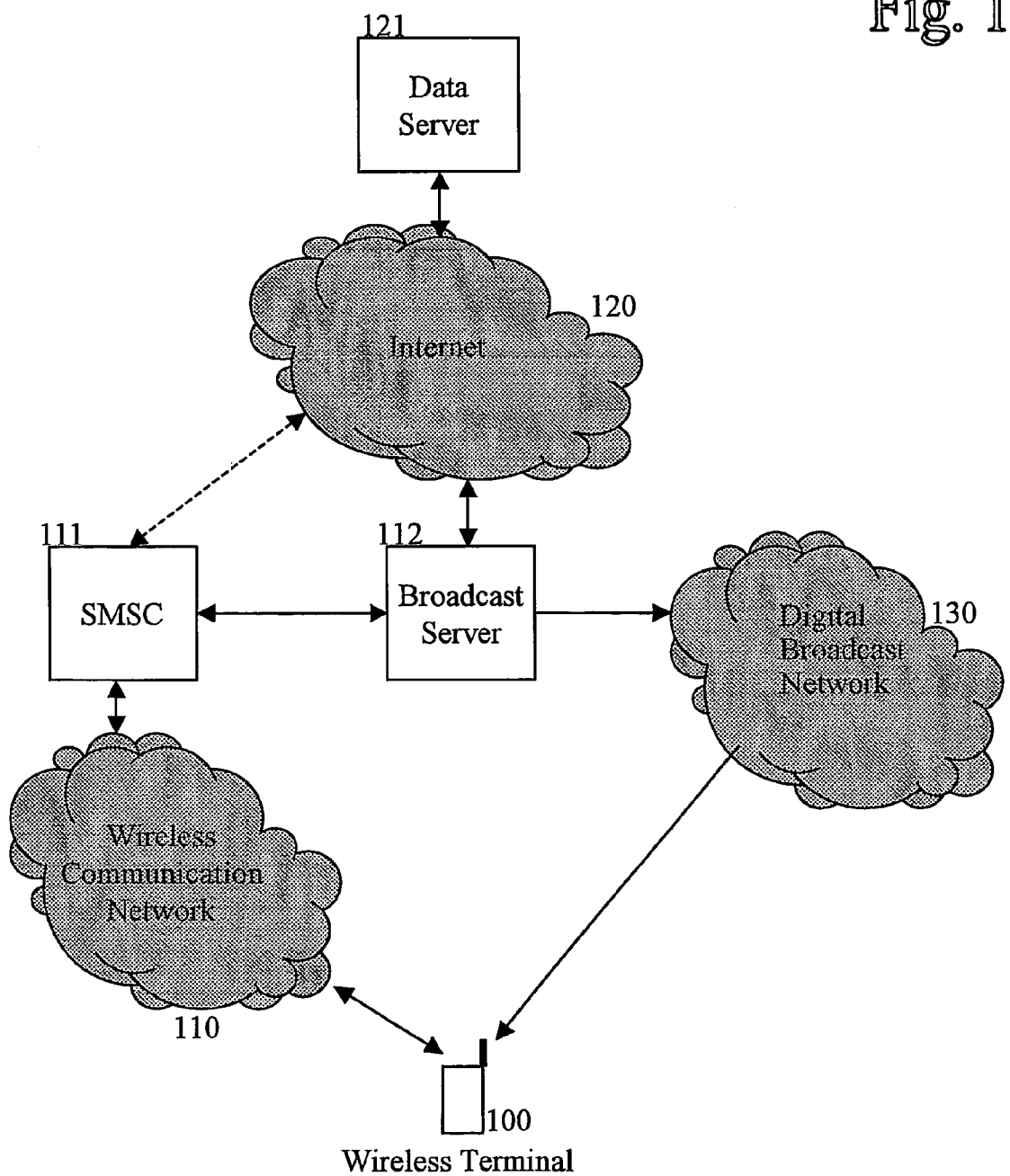
FIG. 1 is an exemplary embodiment of a networking environment in which the principles of the present invention are applied.

FIG. 1 is an exemplary embodiment of a networking environment in accordance with the present invention. The present invention may be applied to any wireless communication systems supporting data services and the transmission of the user message. In the embodiment, the transmission of the user message refers to the transfer of a text message between a wireless terminal 100 and a network element in the wireless communication network 110 without the need to set up a point-to-point connection. This is why the transfer of the message may take place even when in the wireless terminal 100 there is a speech or data call in progress on a circuit-switched point-to-point connection. The message transfer may only require one message. That is, the transfer of one message constitutes the whole transaction, but concatenated messages can be applied as well. In concatenated messages information is parsed from the messages to constitute the transaction.

In the following, the invention will be described in connection with the GSM (Global System for Mobile Communication). Regarding the invention, the operation and structure of the wireless communication system are not relevant, and hence they are described only to a degree that may assist in comprehending the transmission of the user message. Other applicable wireless communication systems in transmitting the message are GPRS (General Packet Radio Services) and 3G (Third generation for Mobile Communication). A publication WO 98/11744, incorporated herein as a reference, discloses an applicable example about transmit of the short message via GSM to the Internet.

Referring to FIG. 1, a mobile switching centre (MSC) (not shown) switches incoming and outgoing calls in the network. It also performs tasks typical of mobile telephone traffic, such as subscriber location management, in co-operation with mobile network subscriber registers a Visitor Location Register VLR and a Home Location Register (HLR). The HLR is a subscriber's home register for a permanent storage of subscriber data. The VLR is a local register to which the subscriber data is copied from the HLR when a mobile subscriber visits the area of the VLR. The wireless terminal 100 communicates with the MSC via base station systems (BSS) (not shown). The BSS includes a base station controller (BSC) (not shown) and base stations (BTS), for example, fixed radio transceivers by which the wireless terminal 100 communicates with a wireless communication network 110 over the radio path.

A short message service (SMS) of the wireless communication network 110 offers means for transferring short messages with limited length (160 ASCII characters) between the wireless terminal 100 and a short message service centre (SMSC) 111. By means of concatenated SMS messages, more than 160 characters can be transmitted. Wireless terminal 100 originated short messages are transferred from the wireless terminal 100 to the SMSC 111. The short messages are destined for other wireless terminal users or for service providers in a fixed network such as in Internet 120. A protocol employed between the SMSC 111 and the wireless terminal 100 is called SMTP (Short Message Transport Protocol).

The SMSC 111 is operationally coupled with the wireless communication network 110 via the MSC. The MSC relays short messages between the wireless terminal 100 and the SMSC 111, and it performs the HLR (and VLR) inquiries possibly needed for the message in the communication. The SMSC 111 is given a dedicated ISDN number in the number space of the wireless communication network 110, and the wireless terminal 100 uses the ISDN number for addressing a short message to the SMSC 111. The short message also identifies the wireless terminal 100 when the Internet data information is to be obtained.

Still referring to FIG. 1, the SMSC 111 is operatively coupled with the Internet 120 such that can serve as a gateway between the wireless communication network 110 and the Internet 120. An interface between the SMSC 111 and the Internet computing systems are bridged in connection with a broadcast server 112 having access to the Internet 120. Accordingly, the embodiment of the invention enables access to the information resources of the Internet 120. The information resources comprise a server computing system such as a data server 121 storing the information resource. An access to the information resource is by the SMS. As described below in detail, the resource is obtained to the user by digital broadcasting in response to the SMS message. A large number of users, local networks and server computing systems may be connected to the Internet 120.

Still referring to FIG. 1, a digital broadcast network (DBN) 130 broadcasts the data information to the wireless terminal 100. Digital broadcast network 130 may, for example, be a DVB or DAB network configured to transfer data information. The DBN 130 is operatively coupled with the Internet 120 such that it is used to transfer data information from the Internet 120 to the wireless terminal 100. An interface between the DBN 130 and the Internet 120 is bridged in operational connection with the broadcast server 112 having access to the Internet 120. Data information, which is specified in the SMS message, from the data server 121 is retrieved to the broadcast server 112 and transferred to the wireless terminal 100 over the DBN 130. The DBN 130 may serve a plurality of wireless terminals.

Advantageously, a terrestrial digital video broadcast (DVB-T) network may be applied in the invention. A user equipped with a suitable Digital Receiver (DR) referred to as the wireless terminal 100 may receive data broadcast over the DBN 130. The data broadcast may respectively include TCP/IP.

Advantageously, the wireless communication network 110 may transfer location information of the wireless terminal 100 to the broadcast server 112 along with the request. In GSM environment location information is obtained from the VLR and the location information can be attached to the SMS message. The broadcast server 112 receives the location information and is able to forward broadcasting to the appropriate broadcast cell of the DBN 130. Alternatively in a system of a plurality of broadcast servers, the location information addresses the request to the preferred broadcast server 112. Therefore, a preferred broadcast cell can be selected for broadcasting the requested content to the wireless terminal 100.

Before transmission, the data, which is received from the data server 121, is processed in the broadcast server 112 operatively coupled with the DBN 130. As is well known in the art, the broadcast server 112 performs a multi-protocol encapsulation and places the IP data into Moving Picture Experts Group-Transmission Stream (MPEG-TS) based data containers. To cater for the delivery of data to a particular terminal or group of terminals, the containers may also hold address information which can be identified and read by a conditional access component in the wireless terminal 100 to determine whether the data is intended for that terminal. Alternatively, to cater for the delivery of data to a plurality of terminals multicast can be applied, and advantageously single sender can reach multiple receivers. A Virtual Private Network (VPN) is formed in the system of the DBN 130, the broadcast server 112, and the wireless terminal 100. A certain bandwidth of the DBN broadcasting is allocated to a point-to-point communication from the DBN 130 to the wireless terminal 100. The DBN 130 may also have various transmission channels for other streams running. The wireless terminal 100 performs a multi-protocol decapsulation to form the IP data packets. As described, the system of the invention provides the facility for suitably equipped terminal 100 to interact. Thus, a user may request the delivery of the Internet site via DBN 130 to the wireless terminal 100. Such functionality requires the return channel from the wireless terminal 100 to DBN 130 as referred above by means of SMS. It is possible for the user to issue a request for a specific Internet content via the user interface of the wireless terminal 100. It should be noted that the request from the user might include content which is not presently being transmitted by the DBN 130. To ensure that the user only receives the requested content, the data is broadcast with an identifier which the conditional access component in the wireless terminal 100 recognises as being intended for the user. In the event, that the content is received by an another terminal, the conditional access component of that terminal will prevent a presentation of the content.

The data server 121 may alternatively be configured in an intranet or local area network (LAN). As can be seen, the present invention may be implemented in connection with any network that can communicate with the broadcast server 112, and includes various multi-node network structures such as multipoint, star, ring, loop, mesh, etc. network topologies used in networks ranging from local area networks (LAN) to proliferative global area networks (GAN) such as the Internet.

Figure 2:
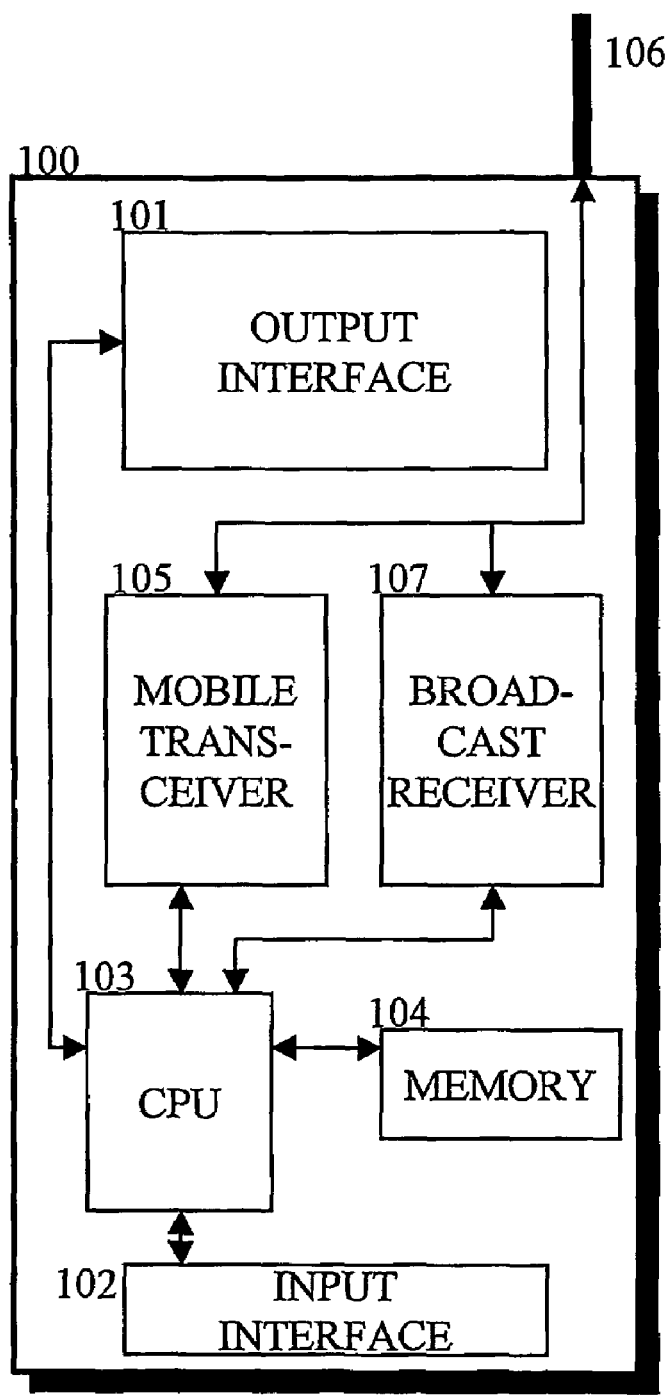
FIG. 2 is a block diagram illustrating a more particular embodiment of wireless terminal by which user may access data information in accordance with the invention.

FIG. 2 is a block diagram illustrating a more particular embodiment of wireless terminal by which user obtain data information in accordance with the invention. A wireless device 100 is operatively coupled with the wireless communication network 110 to engage wireless communication and also with the digital broadcast network 130 to receive data. In the example of FIG. 2, the wireless device 100 represents a mobile terminal such as a handheld PC, personal digital assistant (PDA), mobile telephone, or other device capable of wireless communication. The wireless terminal 100 is SMS-compliant for transmitting the message indicating the resource. In response to the messages the wireless terminal 100 receives the data information via the broadcast. The data information can be web content or even e-mail. An input user interface (UI) 102 on the wireless terminal 100 allows the user to submit requests for data resource. The requests are submitted through the SMS message in the wireless terminal 100. The request is processed by a processor 103 such that SMS message is formed and sent utilising a mobile transceiver 105 that communicates with the wireless communication network 110 via an antenna 106. A broadcast receiver 107 is operatively coupled with the DBN 130 via the antenna 106. Alternatively, the wireless terminal 100 includes two antennas each for respective communication circuits. The wireless terminal 100 comprises the conditional access application (not shown) for accessing received data information. The broadcast receiver 107 receives a list of data packets and data packets corresponding to the request for obtaining data information from the Internet 120. The processor 103 compares the list to received data packets and marks received data packets, thereby missing data packet(s) is detected. For the missed data packet(s) the processor 103 forms an additional SMS message indicating said missed or incorrect packet(s). The mobile transceiver 105 sends the additional SMS message to the broadcast server 112 for re-transmission of the missed packet(s). Received data information is processed and stored on a memory 104 where memory 104 may include volatile memory and/or non-volatile memory. Received data information is presented to user via an output user interface 101 by processing data from memory 104. Stored data information is allowed to change, and the wireless terminal 100 can selectively store requested content provided by the resource.

As described, the received data information from the data server 121 is locally stored in the memory 104 of the wireless terminal 100. The wireless terminal 100 can temporarily store content locally, so that subsequent requests for that particular content is readily accessible to the wireless terminal 100 without requiring further access to the data server 121. The temporarily stored content is the content which is obtained in response to the latest message(s). The similar feature is known in an Internet browser in the computer as a cache. Alternatively, the user can save certain content to the memory 104 locally. The size of the memory 104 is the limit of the content. For example, the wireless terminal 100 has a 32 MB flash memory to store the content. This provides greatly increased flexibility and efficiency, as all of the data information need not be obtained from the data server 121 using the SMS service each time the data information is desired, since selected information is locally stored. Further, all of the information need not be stored in the local memory 104, which may be prohibitive due to the capacity limitations of the local storage of such mobile devices. Selectively storing the received data information locally thereby reduces the number of required SMS service transactions, which takes time and resources. In addition, SMS services may further be associated with a service transaction fee.

Figure 3:
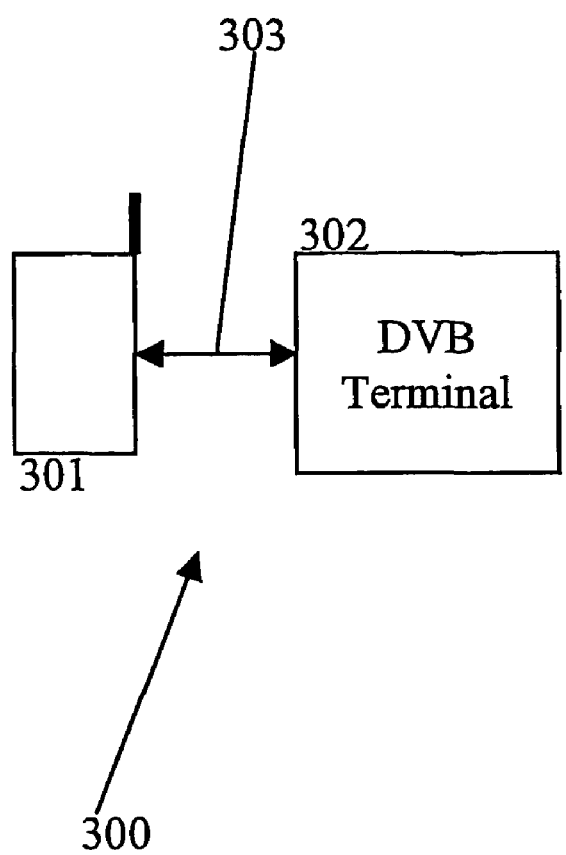
FIG. 3 is a block diagram illustrating an alternative embodiment of wireless terminal by which user obtains data information, and where the terminal has a mobile and a broadcast unit, embodying the invention.

FIG. 3 is a block diagram illustrating an alternative embodiment of a wireless terminal by which the user gets data information, where the wireless terminal includes two separate modules. A functional user terminal 300, which may replace the wireless terminal 100 in the example of FIG. 1, includes two network units for operating in accordance with the invention. A first network unit such as a mobile phone 301 operates within the wireless communication network 110. By the mobile phone 301 the user enters a request for content and the mobile phone 301 sends an SMS message to the mobile network 110 for obtaining the content. A second network unit such as a DVB terminal 302 receives the content, which is requested by the user and transmitted over the DNB 130. The DVB terminal 302 and the mobile phone 301 are operatively coupled for transmitting data information indicating missing data packets of the content. Also, if user requests to use hyperlink of a received Internet site, the communication between the mobile phone 301 and the DVB terminal 302 takes place. A communication link 303 provides the data information exchange between the terminals. An example of the communication link 303 are an infrared link, a cable and Bluetooth, etc. A publication U.S. No. 6,172,673 B1, incorporated herein by a reference, refers to an applicable reception of multimedia information in a terminal having a reception part for Digital Audio Broadcasting (DAB). The system in the publication has a separate mobile phone which is used in giving responses via a GSM network to the DAB network if the terminal does not store the multimedia information which user requests. The terminal has a software agent for controlling reception and storage of received multimedia information in the terminal.

Figure 4:
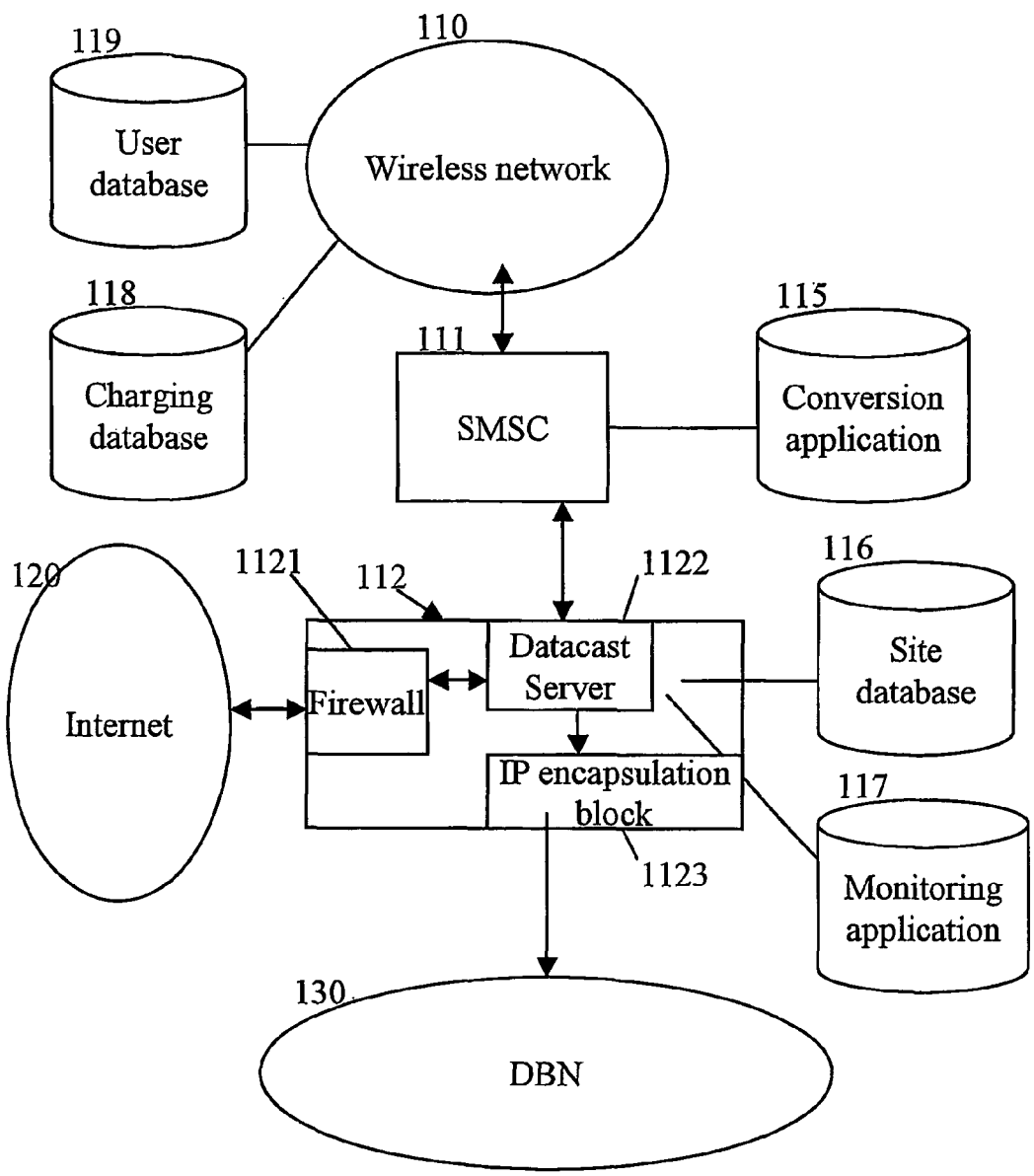
FIG. 4 is a block diagram illustrating a more particular embodiment of a network arrangement which is utilized in bridging communication between networks in accordance with the invention.

FIG. 4 is a block diagram illustrating a more particular embodiment of a network arrangement bridging the communication between networks in accordance with the invention. The SMSC 111 is operatively coupled with the Internet 130 by means of the broadcast server 112. Some of the functions described below may be decentralized between the SMSC 111 and the broadcast server 112 or they may be implemented solely on the SMSC 111. A basic feature of the broadcast server 112 is that it can be connected to data networks. A property, which is also utilized at the physical level of Internet connections. The broadcast server is coupled with the Internet 120 via a firewall 1121. The broadcast server 112 uses IP protocol towards the Internet 120. A datacast server 1122 in the broadcast server 112 controls the IP protocol data transfer. The datacast server receives the request from the SMSC 111 in the IP protocol. An IP encapsulation block 1123 in the broadcast server 112 performs the multi-protocol encapsulation and places the IP data into Moving Picture Experts Group-Transmission Stream (MPEG-TS) based data containers. The encapsulation is the inclusion of one data structure within another structure so that the first data structure is hidden for the time being. To cater for the delivery of data to a particular terminal or group of terminals, the containers may also hold address information which can be identified and read by a conditional access component in the wireless terminal 100 to determine whether the data is intended for that terminal. A plurality of broadcast streams may be broadcast from the broadcast server 112 to the DBN 130. Alternatively, the broadcast server 112 can also receive separate Digital Television (DTV) streams to be wirelessly broadcast over the DBN 130 in addition to the requested content. The data server 121 and application(s) usable in the broadcast server 112 in retrieving the Internet sites from the Internet 120 are commercially available for different operating systems.

The conversion application 115 in the SMSC 111 controls the transmission and reception of SMS messages. The conversion application 115 converts the SMS message into an Internet content request to be forwarded to the broadcast server 112. The publication WO 98/11744 refers to the conversion which is applicable in the present invention. The broadcast server 112 forwards the requests to the Internet 120 and controls the retrievals of the Internet content. The broadcast server 112 comprises also a site database 116 for storing retrieved Internet contents and various parameters, conversion tables etc. Alternatively, the site database 116 can have a list of sponsored web content, and various billing possibilities. A monitoring program 117 is also included in the broadcast server 112 for controlling of a network usage. The monitoring program 117 keeps track on a usage level of networks while networks offer services. This is applicable to charging purposes where a price depends on a network load/traffic. Alternatively, the monitoring program 117 checks whether the user request matches with sponsored content.

A charging database 118 is included in the wireless communication network 110 for compensating or billing the user depending on the content and/or the request for the content. A possibly variable price for the requested content including the request is stored on the charging database 118. The charging database 118 decides on the charging parameters for each user. The charging database 118 receives user related information from a user database 119 via the wireless communication network 110 and information about the retrieved/received content. The charging database 118 may also receive information from the monitoring program 117 about the network usage and/or the received identification information of the wireless terminal user. The broadcast server 112 sets a price for the requested content and sends the price having related user id to the charging database 118. The charging database 118 transfers the charging information to the wireless communication network operator which accordingly charges the user for the requested/received content. For the later use, the user database 119 may include user-related information such as a user profile based on user identity information for the requested services.

The system of the embodiment in FIG. 4 is very advantageous because it can be introduced into the existing short message service centres.

Figure 5:
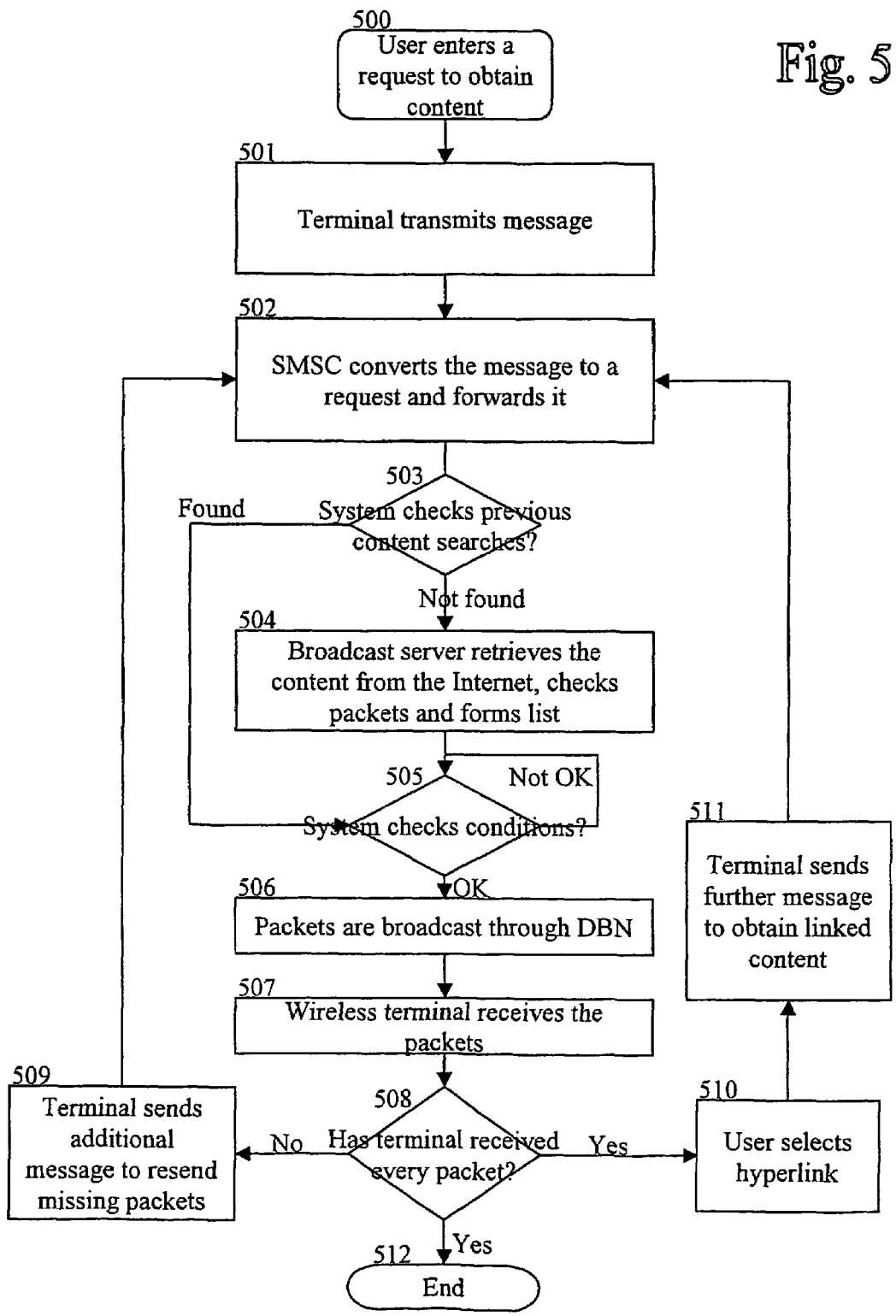
FIG. 5 is a general flow diagram of one embodiment of the invention illustrating a method in which user obtains data information, such as an Internet site, to a wireless terminal.

FIG. 5 is a flow diagram of one embodiment of the invention illustrating a method in which a user gets data content, such as from an Internet site, to a wireless terminal. When requiring information from an Internet site, the user submits a request to obtain the content (Step 500). A request identifier is entered via a user interface, such as a text entry field viewable on a display of the wireless terminal 100. Alternatively, the request is entered via other or additional user interfaces, such as an audio input capable of receiving voice commands or other sound commands. Other known user interfaces may also be used within the scope and spirit of the invention, including Graphical User Interfaces (GUI) and GUI selection tools such as a mouse, joystick, keyboard, touch screen, head mounted display, etc. By the wireless terminal 100 the user submits a SMS message transmitted to the SMSC 111. The SMS message contains an identifier directly or indirectly indicating the Internet site. The direct indication comprises an Internet address such as a URL (Uniform Resource Locator). Alternatively, instead of the URL, the user keys in a short keyword in the message indirectly indicating the desired Internet content. The site database 116 comprises a table for linking keywords to WWW page addresses. An example of such a table is illustrated below. For example, when requesting information on patent information from a WWW page the URL of which is http://www.uspto.gov/patentnumber, the user enters a code PATN 6234567 and the wireless terminal 100 sends the code in the message to the SMSC 111 and the request is converted to the broadcast server 112.

| Keyword | URL |
|---|---|
| PATN 6234567 | http://www.uspto.gov/pat-search/US6234567 |
| WEATHERMAP LONDON | http://www.weathermapdata.com/london |
| . . . | . . . |

Referring to FIG. 5, the wireless terminal 100 transmits the SMS message to a certain number (Step 501). Typically this number is the number indicating service for accessing the resource by a certain operator. The SMSC 111 converts the SMS message into a request and forwards the request the broadcast server 112 (Step 502). Alternatively, the SMSC 111 forwards the request directly to the data server 121, the forwarded request having the address of the broadcast server 112, so that the Internet content can be addressed to the broadcast server 112.

Still referring to FIG. 5, the broadcast server 112 checks if the Internet content has been retrieved previously and is stored on the site database 116 (Step 503). If the site database 116 does not have the content, the broadcast server 112 retrieves the Internet content corresponding to the URL address from the Internet 120 and stores it on the site database 116. The Broadcast server 112 checks packets of the retrieved content and possibly a due time for the transmission over the broadcasting (Step 504). On the basis of the keyword, such as the PATN6234567, the broadcast server 112 retrieves the URL address from the site database 116.

Before the broadcasting, the broadcast server 112 may alternatively have a threshold for certain conditions that are to be checked (Step 505). The conditions may, for example, be that number of terminals obtaining the content must exceed a certain amount. Also, it may be that the user has requested weathermap information for the weekend on Thursday. The system idles until Friday and transfers the requested weather information to the user by the DBN 130 on Friday. This condition may also relate to the charging of the content as will be described afterwards.

The broadcast server 112 performs the multi-protocol encapsulation and places the IP data into the MPEG-TS based data containers. The broadcast server creates also a list of the data packets to be sent. The list contains identity information of about 15-25 packets. The amount of the packets in the list may vary based on effective broadcasting and acknowledgement. The list is formed so that the wireless terminal 100 can check the received packets. The broadcast server 112 forwards the packet stream and related information to the DBN 130 as described referring to FIG. 1 and the DBN 130 broadcasts the data information to at least one wireless terminal 100 (Step 506). The entire content is transferred as periods of 15-25 data packets and the list for those packets.

The wireless terminal 100 receives the list and the data packets, such as the U.S. Pat. No. 6,234,567 (Step 507). The list of the data packets shows number and identity of the packets and possibly the transmission due time. The transmission due time may inform the wireless terminal 100 when to stop receiving the packets. The application running in the wireless terminal 100 compares the received packets to the list. Temporarily stored packets are compared to the list and stored upon marking the packet as received in the list (Step 508).

The wireless terminal 100 presents the requested content if the packets have been substantially received. If the wireless terminal 100 receives all data information that is shown in the list, the terminal 100 presents the requested data info. If the wireless terminal 100 receives such an amount of the data information that it is capable of presenting it, the terminal 100 presents the data. Advantageously, if the transferred data has minor errors, the terminal can correct them by, for example, coding. If data information is substantially missing, wireless terminal 100 creates a request indicating the missing data information. The request is an additional SMS message. The additional SMS message includes the address of the resource and information showing the missing data packets. The wireless terminal 100 sends the additional SMS message to the SMSC 111 (Step 509). The SMSC 111 converts and forwards the request to the broadcast server 112. The broadcast server 112 first checks does it have the missing data packets in the site database 116. If the missing packets are not stored in the server 112, the server 112 retrieves the missing packets from the data server 121. The broadcast server 112 forms a list of the missing packets to be transmitted, and transmits the list and the packets as described referring to the broadcasting. The wireless terminal 100 sends the additional message similarly as it sends the initiating request message. Alternatively instead of the missing packet(s), the entire requested data information is broadcast to the wireless terminal 100. After the content is substantially received, it is presented to the user via the output interface 101. Similar feature of retrieving missing data packets is known in the Internet environment as IP-NACK (Negative Acknowledgement).

In the Internet IP-NACK every single received packet is acknowledged. If every single packet is transmitted by broadcast and acknowledged by the SMS message, the SMSC 111 is overloaded and obstructed. If the return channel is continuously on, this creates costs and takes resources. Therefore, a set of 15-25 packets per list is selected.

If the user wants to select a hyperlink in the content, the user makes an indication to the link using the input user interface 102 (Step 510). For example, the user may view the Internet site and move a mouse to the hyperlink and click the hyperlink. The wireless terminal 100 creates a further SMS message for obtaining data information to which the hyperlink relates. The further SMS message comprises at least the selected hyperlink. Alternatively, if data information of the hyperlink is locally stored, it is obtained from the storage of the wireless terminal 100. The wireless terminal 100 sends the further message to obtain the linked content (Step 511). The further SMS message is sent as referred upon describing the sending of the initiating SMS message. The SMSC 111 converts the further SMS message to the request and forwards the request to the broadcast server 112. The broadcast server 112 checks if data information, which is indicated in the hyperlink, is in the site database 116. If the site database does not store data information, the broadcast server 112 retrieves data information from the Internet 120. The broadcast server 112 forms a list of the missing packets to be transmitted, and transmits the list and the packets as described referring to the broadcasting. The process ends when the wireless terminal 100 presents the content and the user do not select any link (Step 512).

FIG. 6 is a flow diagram of a more particular embodiment depicting a charging model of the short message and/or the content. One embodiment of the invention enables the content provider to define various charging scenarios that depends, for example, on the content. This provides advantages to the invention since the user can access the content free of charge. This will certainly attracts users. Moreover, the invention can yet provide traditional request based billing, and allows content providers to charge for the content itself. Some examples of various usage possibilities are listed below.

|  | No charge to user, message paid by service provider | Message paid by user | Message and content paid by user |
|---|---|---|---|
| Advertisements | X |  |  |
| Time schedules | X |  |  |
| Web-page | (X) depend on provider | X |  |
| MP3 |  |  | X |

Referring to FIG. 6, the user initiates access to the resource (Step 600). The user makes a request identifier to indicate the content. The wireless terminal 100 sends the SMS message, which is converted into the request, to the resource which typically is the data server 121 (Step 601). The request for the content is received at the broadcast server 112. The content and the message for requesting the content can be billed. There are several modes in billing and three are described. 1) The content is totally free for the user (Mode 602). The content provider pays for transmission costs such as the requesting SMS message and for the broadcasting costs (Step 603). For example, advertisement may be free for the user. When the user requests to obtain the advertisements the content provider is charged for the SMS message and possibly for other costs such as the broadcasting cost or Internet usage cost. 2) Content itself is free for the user (Mode 604). The user is charged for the transmission costs such as for the SMS message (Step 605). For example, a traditional web site may establish this kind of billing situation where user obtains the content for free but pay for the SMS message. 3) Content costs a certain amount for user (Mode 606). The user is charged for the SMS message and the content (Mode 607). For example, a digital music such as an MP3 file may establish this kind of billing situation where the user obtains music and pays for both the content and the SMS message.

The content is broadcast to the user via the DBN 130 (Step 608). The broadcast server 112 forwards the content to the DBN 130 and the data broadcasting takes place. The broadcast takes place when billing scenario is set at the broadcast server 112. The wireless terminal 100 receives the content (Step 609). The wireless terminal 100 can inform the broadcast server 112 of successfully receiving the content and the broadcast server 112 is able to end the charging scenario. A telecommunication operator administrates the actual charging of the user. The operator receives charging information from the charging database 118. Alternatively, the administrator of the broadcast server 112 controls the actual charging. The user pays for the service in, for example, a periodical mobile phone bill.

In a further embodiment of the invention obtaining the content is charged based on traffic in the networks. The user requests content from the Internet 120 by the wireless terminal 100. The request for the content is at some point received at the broadcast server 112 or at the networking element having equivalent functions. The monitoring program 117 scans networking systems periodically in order to have information on availability of physical resources of the network. The physical resources are, for example, an available bandwidth, the number of simultaneous users, a time of the network usage, etc. The monitoring program 117 retrieves the physical resource information about the wireless communication network 110, about the Internet 120 and about the DBN 130. A charge for the variable connection for obtaining the data information from the Internet 120 is dependent on the availability of physical network resources. There are various charging scenarios, for illustrative purposes two is described. 1) Lower the quality, cheaper the price of the contract. The lower the quality is, the cheaper the price for the connection is. The cheaper price typically means more users in the networks. Advantageously, this kind of charging compensates a loss in the Quality Of Service (QOS) for the users. 2) More users in the network, the more expensive the price contract. The more simultaneous users there are using the networks, the more expensive the price for the connection is. This kind of billing model tries to keep the QOS on reasonable level. This gives the operator a tool to limit possible network congestion especially during peak hour. Because the network has a certain capacity, the charging model 2) offers a way to limit users when the network is too loaded. More users in the networks typically mean lower transmission quality. Advantageously, the QOS level remains on a reasonable level. Moreover, there might be more nighttime users because the cheaper price for that particular connection attracts them.

In a further embodiment of the invention accessing the resource is charged based on the access. Again, user requests content from the Internet 120 by the wireless terminal 100. The operator of the wireless communication network 110 provides the charging. Alternatively, the operator of the broadcast server 112 provides the charging. There are various charging scenarios implemented by access based charging. 1) The access to data information is free of charge. In this case a certain access identifier, for example, the number of the SMS message is used and the user is identified based on the wireless terminal 100 operating within the wireless communication network 110. 2) An access to the data information includes an extra charging. The user sends the request including the certain access identifier, for example the number of the SMS message. The requested content comprises the content that is considered to have monetary value, for example MP3 music. The operator charges the user for the requested content based on the access identifier identifying the user. Advantageously, some network sites may be free and attract more users. Also, the user will not have to enter extra credit card information to obtain the resource from the network, because the user can be charged according to the access identifier. When the user uses the number access to the Internet 120, the SMS message is read at the SMSC 111. As a content of the SMS message indicates the resource having the requested content in the Internet 120, the number of the SMS message directed to SMSC 111 also tells the system to include the charge for that user. The requested content is broadcast to the user.

One skilled in the art of computer science will be able to create the software in accordance with the invention with appropriate general purpose or special purpose computer hardware to create a computer system and/or computer subcomponents embodying the invention, and to create a computer system and/or computer subcomponents for carrying out the method of the invention.

While there has been described what are believed to be the preferred embodiment of the invention, those skilled in the art will recognize that other and further changes and modifications may be made thereto, and it is intended to cover all such changes and modifications as fall within the scope of the claims. For example, USSD (Unstructured Supplementary Services Data) may be applied as an alternative for the SMS. The USSD provides the operator with a tool to design proprietary supplementary services. As with the SMS, USSD uses a signaling channel as a bearer. However, instead of having the store-and-forward functionality, it is session-oriented. This means that when the user accesses a USSD service, a session is established and the radio connection stays open until the user, application, or time-out releases it. Response times for interactive applications are faster. A packet switched data transfer contains the evolvement of the SMS and the USSD into the GPRS and further into the UMTS. These sophisticated wireless communication networks provide the ability to transfers the message in form of packets via the wireless communication network. Also instead of the SMS, R-data offers also a way to transfer the message in IS-136 (Time Division Multiple Access, TDMA) network to an element of the wireless communication network to be forwarded to the Internet.

The invention claimed is:

1. A method comprising:
    transmitting a message from a wireless terminal via a wireless communication network to a computer network for obtaining data content, the message indicating a resource containing the data content in the computer network,
    receiving at the wireless terminal one or more data packets relating to the data content from the resource over a broadcast network,
    receiving at the wireless terminal a list of data packets corresponding to the data content,
    comparing the received data packets to the list of data packets corresponding to the data content in order to identify a possible occurrence of one or more missing data packets, and if an occurrence of one or more missing data packets was identified, creating an additional message for obtaining at least one of the missing data packets.

2. The method according to claim 1, wherein the additional message is sent to a broadcast server.

3. The method according to claim 2, wherein the wireless terminal receives at least one of the missing data packets from the broadcast server, which is in communication with a site database, and wherein if the missing data packets are not stored in the site database, the data packets are retrieved from the computer network and received at the wireless terminal after the data packets are transmitted via the computer network to at least one of the broadcast server and the site database.

4. The method according to claim 2, wherein the wireless communication network transfers location information of the wireless terminal to the computer network along with the message, wherein the location information addresses the message to a preferred broadcast server.

5. The method according to claim 2, wherein a virtual private network is formed in the system of the broadcast network, the broadcast server, and the wireless terminal.

6. The method according to claim 2, wherein before the wireless terminal receives the one or more missing data packets from the broadcast server, a condition threshold at the broadcast server is checked, the condition threshold comprising at least one of the number of terminals obtaining the data content and the charging of the data content.

7. The method according to claim 1 or 2, wherein the wireless communication network transfers location information of the wireless terminal to the computer network along with the message and the transferring of one or more data packets over the broadcast network is done using an appropriate broadcast cell of the broadcast network.

8. The method according to claim 1, wherein the wireless terminal outputs received data content, receives user input selecting a link in the output information, and generates a further message, the further message including at least an address of the link for obtaining the resource via the link.

9. The method according to claim 1, wherein at least one of the data packets received over the broadcast network comprises an identifier associated with a conditional access component in the wireless terminal.

10. The method according to claim 1, wherein the message identifies a plurality of wireless terminals and the data content received over the broadcast network is broadcast to the plurality of wireless terminals identified in the message.

11. The method according to claim 1, wherein the message comprises at least one of a SMS message and a message containing packages.

12. The method according to claim 1, wherein the data content comprises data information in the Internet.

13. The method according to claim 1, wherein the computer network comprises the Internet.

14. The method according to claim 1, wherein the broadcast network comprises a digital video broadcasting network.

15. The method according to claim 1, wherein the data content is transferred as periods of data packets and wherein the list of data packets corresponds to the transferred periods of data packets.

16. The method according to claim 1, wherein the message creates a charge based on at least one of the following types of resource related information: a function of time, a Quality Of Service (QOS) requirement to the data content, a function of available bandwidth, a function of simultaneous users, a load in at least one of the wireless communication network, the computer network, and the broadcast network, and means for accessing to the resource.

17. The method according to claim 16, wherein the charging is attached to the charging of the terminal in the wireless communication network.

18. An apparatus comprising:
an input user interface configured to receive an address of data content for addressing a message to a resource in a computer network via a wireless communication network,
means for transmitting the message from the apparatus via the wireless communication network to the computer network for obtaining data content, the message indicating the resource containing the data content in the network,
a broadcast network interface configured to receive one or more data packets relating to the data content from the resource over a broadcast network, and a list of data packets corresponding to the data content,
means for comparing the received data packets to the list of data packets corresponding to the data content in order to identify a possible occurrence of one or more missing data packets, and
means for creating an additional message for obtaining at least one of the missing data packets if an occurrence of missing data packets was identified.

19. An apparatus according to claim 18, wherein the means for transmitting the message comprises a first wireless unit and the broadcast network interface comprises a second wireless unit, wherein the first and the second wireless units comprises two detached devices.

20. An apparatus according to claim 19, wherein the first wireless unit comprises a mobile phone and the second wireless unit comprises a digital video broadcasting terminal.

21. An apparatus according to claim 18, further comprising means for transmitting a further message to a broadcast server if the input user interface receives an instruction based on outputted data content.

22. A server comprising:
means for receiving a message from a wireless terminal via a wireless communication network directed to a computer network for obtaining data content, the message indicating a resource containing the data content in the computer network,
means for transferring one or more data packets relating to the data content from the resource over a broadcast network to the wireless terminal,
means for transferring a list of data packets to the wireless terminal, the list corresponding to the data content in order to identify a possible occurrence of one or more missing data packets, and
means for receiving an additional message for obtaining at least one of the missing data packets if an occurrence of missing data packets was identified.

23. A system comprising:
a wireless terminal configured to transmit a message from the wireless terminal via a wireless communication network to a computer network for obtaining data content, the message indicating a resource containing the data content in the computer network,
a broadcast network configured to transfer one or more data packets relating to the data content from the resource via the broadcast network to the wireless terminal, and a list of data packets corresponding to the data content, means for comparing the received data packets to the list of data packets corresponding to the data content in order to identify a possible occurrence of one or more missing data packets, and means for creating an additional message for obtaining at least one of the missing data packets if an occurrence of missing data packets was identified.

24. A system according to claim 23, wherein the data content comprises Internet data information, the wireless communication network comprises a mobile network, the computer network comprises the Internet and the broadcast network comprises a digital video broadcasting network.

25. An apparatus comprising:
an input user interface configured to receive an address corresponding to data content and to use the address to address a message to a resource in a computer network, the message to be sent via a wireless communication network;
a transmitter configured to transmit the message from the apparatus via the wireless communication network to the computer network, the message indicating the resource in the computer network containing the data content;
a broadcast network interface configured to receive one or more data packets relating to the data content from the resource over a broadcast network, and a list of data packets corresponding to the data content;
a processor configured to compare the received data packets to the list of data packets corresponding to the data content in order to identify a possible occurrence of one or more missing data packets, and further configured to create an additional message to obtain at least one of the missing data packets if an occurrence of missing data packets was identified.

26. The apparatus of claim 25, further comprising a memory configured to store the data content received over the broadcast network and received at the apparatus.

27. The apparatus of claim 25, further comprising an output user interface configured to present the data content to a user of the apparatus.

28. A server comprising:
a receiver configured to receive a message from a wireless terminal via a wireless communication network directed to a computer network for obtaining data content, the message indicating a resource containing the data content in the computer network; and
a transmitter configured to transfer one or more data packets relating to the data content from the resource over a broadcast network to the wireless terminal, and a list of data packets corresponding to the data content to enable the wireless terminal to identify a possible occurrence of one or more missing data packets,
wherein the receiver is further configured to receive an additional message from the wireless terminal for obtaining at least one of the missing data packets if an occurrence of missing data packets was identified.

* * * * *